United States Patent
Aoyama et al.

(10) Patent No.: US 11,552,548 B2
(45) Date of Patent: Jan. 10, 2023

(54) POWER SUPPLY CONTROL DEVICE HAVING A PAIR OF TRANSISTORS

(71) Applicants: Sumitomo Wiring Systems, Ltd., Mie (JP); TOYOTA JIDOSHA KABUSHIKI KAISHA, Toyota (JP)

(72) Inventors: Shinji Aoyama, Mie (JP); Hiroshi Kimoto, Mie (JP); Nobutoshi Hagiwara, Toyota (JP); Takumi Matsumoto, Toyota (JP)

(73) Assignees: SUMITOMO WIRING SYSTEMS, LTD., Mie (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/790,968

(22) Filed: Feb. 14, 2020

(65) Prior Publication Data
US 2020/0313556 A1    Oct. 1, 2020

(30) Foreign Application Priority Data
Mar. 29, 2019   (JP) .............................. JP2019-068574

(51) Int. Cl.
*H02M 1/08*    (2006.01)
*H02M 3/158*   (2006.01)

(52) U.S. Cl.
CPC ........... *H02M 1/08* (2013.01); *H02M 3/1582* (2013.01)

(58) Field of Classification Search
CPC ............. H03K 17/002; H03K 17/6871; H03K 17/6872; H03K 17/082; H03K 17/693; H03K 17/687; H03K 17/08; H03K 17/0822; H02H 3/08; H02M 1/08; H02M 1/088
See application file for complete search history.

(56) References Cited

U.S. PATENT DOCUMENTS

| | | | | |
|---|---|---|---|---|
| 5,559,656 | A * | 9/1996 | Chokhawala | H01L 27/0248 361/111 |
| 6,140,806 | A * | 10/2000 | Gohara | G05F 3/242 323/282 |
| 7,777,993 | B2 * | 8/2010 | Sakamoto | B60S 1/08 361/33 |
| 8,717,068 | B2 * | 5/2014 | Wasekura | H03K 17/6877 327/108 |
| 9,800,239 | B2 * | 10/2017 | Hayashiguchi | H03K 17/08122 |

(Continued)

FOREIGN PATENT DOCUMENTS

| | | |
|---|---|---|
| JP | 2004215415 A | 7/2004 |
| JP | 2005287225 A | 10/2005 |

(Continued)

*Primary Examiner* — Gustavo A Rosario-Benitez
(74) *Attorney, Agent, or Firm* — Honigman LLP (57) ABSTRACT

A power supply control device controls power supply through two branch paths branched from a common power supply path. Two N-channel FETs are respectively disposed in the two branch paths. A booster circuit outputs a voltage from a common output end, and applies a voltage to gates of the two FETs through a circuit resistor. Two charge resistors are respectively disposed in two applying paths through which a voltage is applied from the output end of the booster circuit to the gates of the two FETs. Each of two diodes are respectively connected between both ends of each of the two charge resistors. Cathodes of the two diodes are disposed on the side of the booster circuit.

5 Claims, 6 Drawing Sheets

(56) References Cited

U.S. PATENT DOCUMENTS

| | | | | |
|---|---|---|---|---|
| 10,924,104 B2* | 2/2021 | Spaeth | .................. | H02M 3/158 |
| 2009/0128106 A1* | 5/2009 | Takahashi | ............... | G05F 1/575 |
| | | | | 323/277 |
| 2013/0133358 A1* | 5/2013 | Ito | ........................ | H03K 17/127 |
| | | | | 62/426 |
| 2014/0218099 A1* | 8/2014 | Yamada | ............. | H03K 17/0412 |
| | | | | 327/482 |
| 2015/0084612 A1* | 3/2015 | Kanzaki | ............ | H03K 17/6871 |
| | | | | 323/282 |
| 2016/0248320 A1* | 8/2016 | Sugisawa | ............. | H03K 17/145 |
| 2016/0261180 A1 | 9/2016 | Brueckner et al. | | |
| 2017/0207782 A1* | 7/2017 | Takizawa | ......... | H03K 17/08122 |
| 2018/0152093 A1* | 5/2018 | Zushi | ................... | H02M 1/088 |
| 2018/0375508 A1* | 12/2018 | Morisaki | ............ | H03K 17/0822 |
| 2019/0074828 A1* | 3/2019 | Yamaji | .................... | H02M 1/08 |
| 2019/0372567 A1* | 12/2019 | Yoshida | ............. | H03K 17/0828 |

FOREIGN PATENT DOCUMENTS

| | | |
|---|---|---|
| JP | 2009147994 A | 7/2009 |
| JP | 2011146901 A | 7/2011 |
| JP | 2014-239293 A | 12/2014 |
| WO | 2017026367 A1 | 2/2017 |

\* cited by examiner

POWER SUPPLY CONTROL DEVICE HAVING A PAIR OF TRANSISTORS

CROSS-REFERENCE TO RELATED APPLICATION

This Nonprovisional application claims priority under 35 U.S.C. § 119(a) to Patent Application No. 2019-068574 filed in Japan on Mar. 29, 2019, the entire contents of which are hereby incorporated by reference.

FIELD

This disclosure relates to a power supply control device.

BACKGROUND

A power supply control device that controls power supply from a DC power supply to a load is mounted in a vehicle (refer to, for example, Japanese Patent Laid-Open Publication No. 2014-239293). In the power supply control device described in Japanese Patent Laid-Open Publication No. 2014-239293, two N-channel field effect transistors (FETs) are connected in parallel. The two FETs function as switches. A control circuit controls the power supply to the load by switching the two FETs on or off. When the two FETs are ON, the DC power supply supplies power to the load through the two FETs. When the two FETs are OFF, the power supply to the load is stopped.

SUMMARY

The N-channel FET is switched on when a gate voltage value having a reference corresponding to the potential of the source is adjusted to a voltage value equal to or higher than a predetermined ON threshold value. The N-channel FET is switched off when the gate voltage value having a reference corresponding to the potential of the source is adjusted to a voltage value lower than a predetermined OFF threshold value. The ON threshold value is equal to or higher than the OFF threshold value. The OFF threshold value exceeds 0 V. In the power supply control device described in Japanese Patent Laid-Open Publication No. 2014-239293, when the FET is ON, a current is input to the drain and a current is output from the source.

As a configuration of the control circuit provided in the power supply control device described in Japanese Patent Laid-Open Publication No. 2014-239293, there is a configuration in which a driving circuit applies a voltage from a common output end to gates of two FETs. As one of the failures of the FET, there is a short-circuit failure in which the gate and the source are short-circuited and the drain and the source are short-circuited.

It is assumed that the two FETs are ON. In a configuration in which the driving circuit applies a voltage from the common output end to the gates of the two FETs, when the short-circuit failure occurs in one FET, a voltage value between the source and the gate in the other FET drops to 0 V, that is, a voltage value lower than the OFF threshold value, and is maintained at 0 V.

Therefore, when the short-circuit failure occurs in one FET, the other FET is switched off and maintains the OFF state. In this case, the current concentrates on the FET where the short circuit has occurred. When an excessive current flows through the FET, the temperature of the FET rises to an abnormal temperature. As a result, various problems may occur. For example, the temperature of a peripheral device of the FET also rises, and accordingly, a malfunction may occur in the operation of the peripheral device.

This disclosure has been made with the aim of solving the above problems, and it is an object of this disclosure to provide a power supply control device capable of maintaining the ON state of the other transistor even when a short-circuit failure occurs in one of two transistors.

A power supply control device according to one aspect of this disclosure controls power supply through two branch paths branched from a common power supply path. The power supply control device includes: two transistors which are respectively disposed in the two branch paths, each transistor having a resistance value between a current input end to which a current is input and a current output end from which a current is output, the resistance value decreasing as a voltage value of a control end having a reference corresponding to a potential of the current output end increases; a first resistor; a voltage applying unit that outputs a voltage from a common output end and applies a voltage to the control ends of the two transistors through the first resistor; two second resistors that are respectively disposed in two applying paths through which a voltage is applied from the output end of the voltage applying unit to the control ends of the two transistors; and two diodes, each of which is connected between both ends of each of the two second resistors and has a cathode disposed on a side of the voltage applying unit.

According to the aspect above, even when a short-circuit failure occurs in one of two transistors, it is possible to maintain the ON state of the other transistor.

The above and further objects and features will move fully be apparent from the following detailed description with accompanying drawings.

DETAILED DESCRIPTION OF PREFERRED EMBODIMENTS OF THE DISCLOSURE

First of all, Embodiment of this disclosure is recited and explained. At least parts of Embodiment described below may be combined arbitrarily.

A power supply control device according to one aspect of this disclosure controls power supply through two branch paths branched from a common power supply path. The power supply control device includes: two transistors which are respectively disposed in the two branch paths, each transistor having a resistance value between a current input end to which a current is input and a current output end from which a current is output, the resistance value decreasing as a voltage value of a control end having a reference corresponding to a potential of the current output end increases; a first resistor; a voltage applying unit that outputs a voltage from a common output end and applies a voltage to the control ends of the two transistors through the first resistor; two second resistors that are respectively disposed in two applying paths through which a voltage is applied from the output end of the voltage applying unit to the control ends of the two transistors; and two diodes, each of which is connected between both ends of each of the two second resistors and has a cathode disposed on a side of the voltage applying unit.

In the aspect above, a transistor is, for example, an N-channel FET. In this case, the gate, the drain, and the source correspond to a control end, a current input end, and a current output end, respectively. In the two transistors, when the voltage value of the control end having a reference corresponding to the potential of the current output end is high, a resistance value between the current input end and the current output end is small. Therefore, the two transistors are ON. In this state, it is assumed that in one transistor, a short-circuit failure has occurred in which the control end and the current output end are short-circuited and the current input end and the current output end are short-circuited. In this case, the voltage value of the control end of a normal transistor is higher as the resistance value of a second resistor disposed in the applying path, through which a voltage is applied to the control end of the transistor in which the short-circuit failure has occurred, is larger. For this reason, in a case where a resistor having a large resistance value is used as the second resistor, even when the short-circuit failure occurs in one transistor, the other transistor maintains the ON state.

In each of the two transistors, an input capacitor is formed between the control end and the current output end. When a voltage is applied to the control end of the transistor through the second resistor, the input capacitor is charged and the voltage value of the control end increases. As a result, the resistance value between the current input end and the current output end decreases so that the transistor is switched on. When the input capacitor is discharged, the voltage value of the control end decreases. As a result, the resistance value between the current input end and the current output end increases so that the transistor is switched off. Since the input capacitor is discharged through a diode instead of the second resistor having a large resistance value, the power stored in the input capacitor is quickly emitted, so that the transistor can be quickly switched off.

A power supply control device according to one aspect of this disclosure includes two third resistors that are respectively connected in series to the two diodes. Each of two series circuits includes the diode and the third resistor and is connected between both the ends of each of the two second resistors. Each of the two second resistors has a resistance value larger than a resistance value of the third resistor connected between both ends of each of the two second resistors.

In the aspect above, the resistance value of a third resistor is smaller than the resistance value of the second resistor. For this reason, an input capacitor of each transistor emits power through a series circuit including a diode and the third resistor.

In a power supply control device according to one aspect of this disclosure, a voltage value Vp of a voltage output from the output end by the voltage applying unit, a voltage value Vi of a current input end of a first transistor included in the two transistors, a resistance value R1 of the first resistor, and a resistance value R2 of the second resistor disposed in an applying path through which a voltage is applied to a control end of a second transistor included in the two transistors satisfy a following expression.

$(Vp-Vi)\cdot R2/(R1+R2) \geq Vg$,

Vg is a voltage value between the current output end and the control end and is a voltage value necessary for switching on the first transistor.

In the aspect above, in a case where the current input end of the first transistor is directly connected to the current input end of the second transistor, when the control end and the current output end are short-circuited and the current input end and the current output end are short-circuited in the second transistor, the voltage value of the control end having a reference corresponding to a fixed potential is Vi in the second transistor. For this reason, in the first transistor, the voltage value of the control end having a reference corresponding to a fixed potential is expressed by $((Vp-Vi)\cdot R2/(R1+R2)+Vi)$. Here, since $(Vp-Vi)\cdot R2/(R1+R2) \geq Vg$ is satisfied, the voltage value of the control end having a reference corresponding to a fixed potential is $(Vg+Vi)$ or higher. As a result, in the first transistor, the voltage value of the control end having a reference corresponding to the potential of the current output end is Vg or higher, so that the first transistor reliably maintains the ON state.

The specific example of the power supply control device according to Embodiment of this disclosure is explained with reference to the drawings below. Note that the present disclosure is not limited to these exemplifications, and is defined by the Claims, which intends to include all the meanings equivalent to the Claims and all the modifications within the Claims.

As a specific example of this Embodiment, a power supply system including a power supply control device will be explained.

Configuration of Power Supply System

Figure 1:
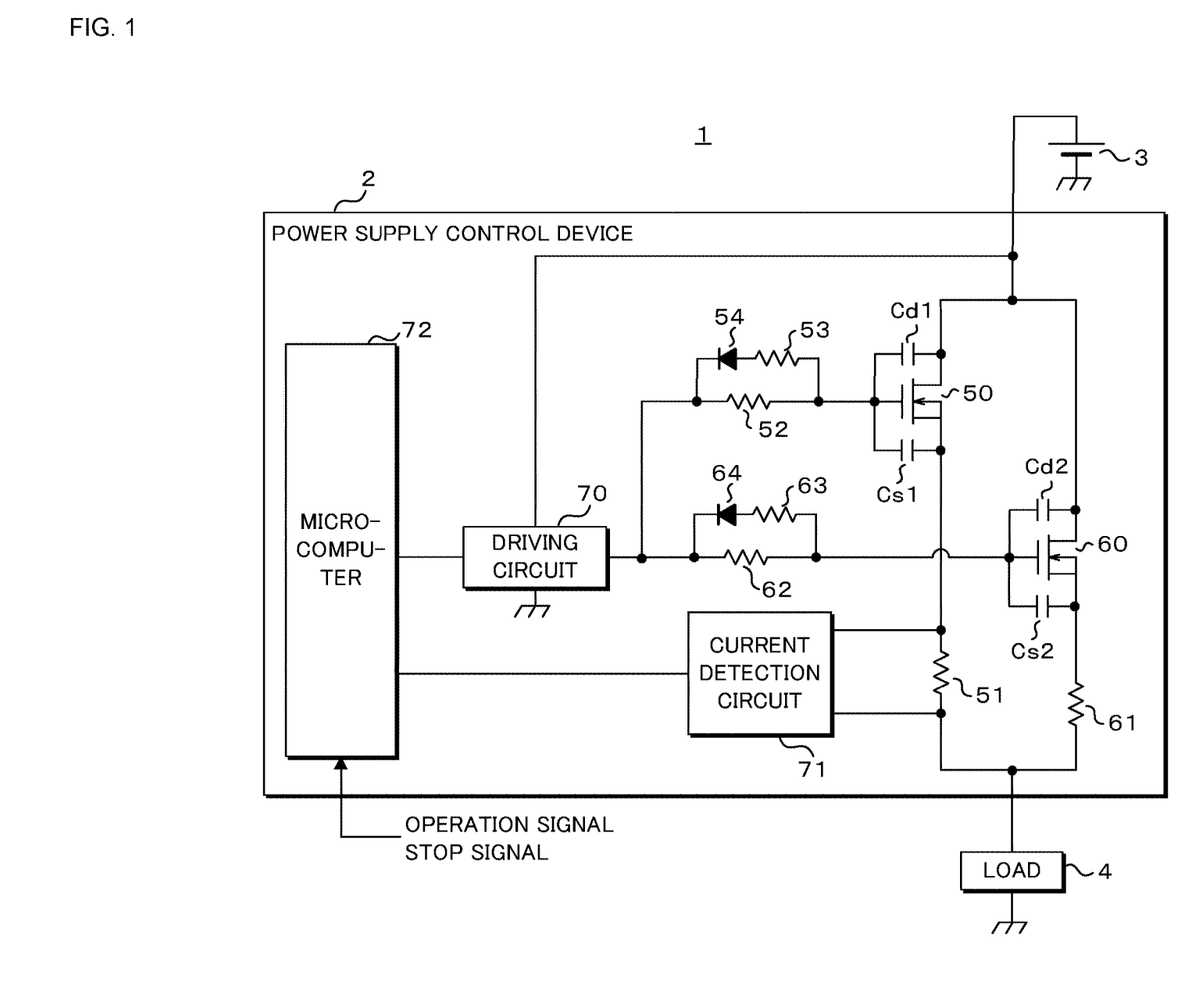
FIG. 1 is a block diagram illustrating a main configuration of a power supply system in this Embodiment.

FIG. 1 is a block diagram illustrating a main configuration of the power supply system 1. The power supply system 1 is preferably mounted in a vehicle, and includes a power supply control device 2, a DC power supply 3, and a load 4. The power supply control device 2 is connected to the positive electrode of the DC power supply 3 and one end of the load 4. The negative electrode of the DC power supply 3 and the other end of the load 4 are grounded. The grounding is realized, for example, by connection to the vehicle body. The ground potential is a fixed potential.

The power supply control device 2 performs electrical connection between the DC power supply 3 and the load 4. The power supply control device 2 performs electrical disconnection between the DC power supply 3 and the load 4. The DC power supply 3 is, for example, a battery. The load 4 is an electric device mounted in the vehicle. When power is supplied to the load 4, the load 4 operates. When the power supply to the load 4 is stopped, the load 4 stops operating.

An operation signal for giving an instruction to operate the load 4 and a stop signal for giving an instruction to stop the operation of the load 4 are input to the power supply control device 2. When the operation signal is input, the power supply control device 2 electrically connects the DC power supply 3 and the load 4 to each other. As a result, the DC power supply 3 supplies power to the load 4 so that the load 4 operates. When the stop signal is input, the power supply control device 2 electrically disconnects the DC power supply 3 and the load 4 from each other. As a result, the power supply to the load 4 is stopped so that the load 4 stops operating. In this manner, the power supply control device 2 controls the power supply to the load 4.

Configuration of Power Supply Control Device

The power supply control device 2 includes N-channel FETs 50 and 60, series resistors 51 and 61, charge resistors 52 and 62, discharge resistors 53 and 63, diodes 54 and 64, a driving circuit 70, a current detection circuit 71, and a microcomputer 72. In the FET 50, an input capacitor Cd1 is connected between the gate and the drain, and an input capacitor Cs1 is connected between the gate and the source. The input capacitors Cd1 and Cs1 are formed in the process of manufacturing the FET 50, and are also called parasitic capacitors. Similarly, in the FET 60, an input capacitor Cd2 is connected between the gate and the drain, and an input capacitor Cs2 is connected between the gate and the source. The input capacitors Cd2 and Cs2 are formed in the process of manufacturing the FET 60, and are also called parasitic capacitors.

The drains of the FETs 50 and 60 are connected to the positive electrode of the DC power supply 3. The sources of the FETs 50 and 60 are connected to one ends of the series resistors 51 and 61, respectively. The other ends of the series resistors 51 and 61 are connected to one end of the load 4. The gate of the FET 50 is connected to one end of the charge resistor 52. The other end of the charge resistor 52 is connected to the driving circuit 70. One end of the charge resistor 52 is further connected to one end of the discharge resistor 53. The other end of the discharge resistor 53 is connected to the anode of the diode 54. The cathode of the diode 54 is connected to the other end of the charge resistor 52. Thus, the discharge resistor 53 is connected in series to the diode 54. A series circuit including the discharge resistor 53 and the diode 54 is connected between both ends of the charge resistor 52. The resistance value of the charge resistor 52 is larger than the resistance value of the discharge resistor 53.

Similarly, the gate of the FET 60 is connected to one end of the charge resistor 62. The other end of the charge resistor 62 is connected to the driving circuit 70. One end of the charge resistor 62 is further connected to one end of the discharge resistor 63. The other end of the discharge resistor 63 is connected to the anode of the diode 64. The cathode of the diode 64 is connected to the other end of the charge resistor 62. Thus, the discharge resistor 63 is connected in series to the diode 64. A series circuit including the discharge resistor 63 and the diode 64 is connected between both ends of the charge resistor 62. The resistance value of the charge resistor 62 is larger than the resistance value of the discharge resistor 63.

Each of the charge resistors 52 and 62 corresponds to a second resistor. Each of the discharge resistors 53 and 63 corresponds to a third resistor.

The driving circuit 70 is further connected to the drains of the FETs 50 and 60 and the microcomputer 72. In addition, the driving circuit 70 is grounded. One end and the other end of the series resistor 51 are individually connected to the current detection circuit 71. The current detection circuit 71 is further connected to the microcomputer 72.

In each of the FETs 50 and 60, a current is input from the DC power supply 3 to the drain, and a current is output from the source to the load 4. In addition, in each of the FETs 50 and 60, as a gate voltage value having a reference corresponding to the potential of the source increases, the resistance value between the drain and the source decreases.

In each of the FETs 50 and 60, the drain, the source, and the gate correspond to a current input end, a current output end, and a control end, respectively.

In each of the FETs 50 and 60, when the gate voltage value having a reference corresponding to the potential of the source is equal to or higher than a predetermined ON threshold value, the resistance value between the drain and the source is sufficiently small. At this time, each of the FETs 50 and 60 is ON, and a current flows through the drain and the source in each of the FETs 50 and 60. When the FETs 50 and 60 are switched on, the DC power supply 3 and the load 4 are electrically connected to each other, so that the DC power supply 3 supplies power to the load 4. At this time, a part of the current output from the positive electrode of the DC power supply 3 flows in the order of the FET 50, the series resistor 51, and the load 4. The rest of the current output from the positive electrode of the DC power supply 3 flows in the order of the FET 60, the series resistor 61, and the load 4.

In each of the FETs 50 and 60, when the gate voltage value having a reference corresponding to the potential of the source is lower than a predetermined OFF threshold value, the resistance value between the drain and the source is sufficiently large. At this time, each of the FETs 50 and 60 is OFF, and no current flows through the drain and the source in each of the FETs 50 and 60. When the FETs 50 and 60 are switched off, the DC power supply 3 and the load 4 are electrically disconnected from each other, so that the power supply to the load 4 is stopped. The ON threshold value is equal to or higher than the OFF threshold value, and the OFF threshold value exceeds 0 V.

As described above, the power supply control device 2 controls the power supply to the load 4 through two branch paths branched from the common power supply path where the positive electrode of the DC power supply 3 is disposed. The FET 50 is disposed in one branch path. The FET 60 is disposed in the other branch path.

The microcomputer 72 outputs a binary signal configured by a high level voltage and a low level voltage to the driving circuit 70. When the microcomputer 72 switches the voltage output to the driving circuit 70 from the low level voltage to the high level voltage, the driving circuit 70 boosts the output voltage of the DC power supply 3 to a target voltage set in advance. The driving circuit 70 applies the boosted voltage (target voltage) to the gate of the FET 50 through the charge resistor 52, and applies the boosted voltage to the gate of the FET 60 through the charge resistor 62. The boosted voltage is a voltage value having a reference corresponding to the ground potential.

When the driving circuit 70 applies the boosted voltage to the gate of the FET 50, the input capacitors Cd1 and Cs1 are charged. As a result, in the FET 50, the gate voltage value having a reference corresponding to the potential of the source increases. When the gate voltage value having a reference corresponding to the potential of the source becomes a voltage value equal to or higher than the ON threshold value, the FET 50 is switched on.

Similarly, when the driving circuit 70 applies the boosted voltage to the gate of the FET 60, the input capacitors Cd2 and Cs2 are charged. As a result, in the FET 60, the gate voltage value having a reference corresponding to the potential of the source increases. When the gate voltage value having a reference corresponding to the potential of the source becomes a voltage value equal to or higher than the ON threshold value, the FET 60 is switched on.

When the microcomputer 72 switches the voltage output to the driving circuit 70 from the high level voltage to the low level voltage, the cathodes of the diodes 54 and 64 are grounded. As a result, the input capacitors Cd1 and Cs1 of the FET 50 emit the stored power through the discharge resistor 53 and the diode 54. In addition, the input capacitors Cd2 and Cs2 of the FET 60 emit the stored power through the discharge resistor 63 and the diode 64.

When the input capacitors Cs1 and Cd1 are discharged, in the FET 50, the gate voltage value having a reference corresponding to the potential of the source decreases. When the gate voltage value having a reference corresponding to the potential of the source becomes a voltage value lower than the OFF threshold value, the FET 50 is switched off.

Similarly, when the input capacitors Cs2 and Cd2 are discharged, in the FET 60, the gate voltage value having a reference corresponding to the potential of the source decreases. When the gate voltage value having a reference corresponding to the potential of the source becomes a voltage value lower than the OFF threshold value, the FET 60 is switched off.

As described above, the driving circuit 70 switches the FETs 50 and 60 on or off by adjusting the gate voltage values having a reference corresponding to the potential of the sources in the FETs 50 and 60.

When the FET 50 is ON, a current flows through the series resistor 51. When the FET 60 is ON, a current flows through the series resistor 61. The current detection circuit 71 detects the current value of the current flowing through the series resistor 51. The current detection circuit 71 outputs current information indicating the detected current value, to the microcomputer 72. The current information is, for example, a voltage value proportional to the current value detected by the current detection circuit 71, that is, the current value of the current flowing through the series resistor 51.

The operation signal and the stop signal are input to the microcomputer 72. When the operation signal is input, the microcomputer 72 switches the voltage output to the driving circuit 70 to the high level voltage. Therefore, the driving circuit 70 switches on the FETs 50 and 60, and the DC power supply 3 supplies power to the load 4. As a result, the load 4 operates. When the stop signal is input, the microcomputer 72 switches the voltage output to the driving circuit 70 to the low level voltage. Therefore, the driving circuit 70 switches off the FETs 50 and 60, and the power supply from the DC power supply 3 to the load 4 is stopped. As a result, the load 4 stops operating.

When the FETs 50 and 60 are ON, the microcomputer 72 determines whether or not the current value of the current flowing through the FETs 50 and 60 is equal to or larger than a reference current value based on the current value indicated by the current information input from the current detection circuit 71. When the microcomputer 72 determines that the current value of the current flowing through the FETs 50 and 60 is equal to or larger than the reference current value, the microcomputer 72 switches the voltage output to the driving circuit 70 to the low level voltage, and the driving circuit 70 switches off the FETs 50 and 60. This prevents an overcurrent from flowing through the FETs 50 and 60.

Configuration of Driving Circuit

Figure 2:
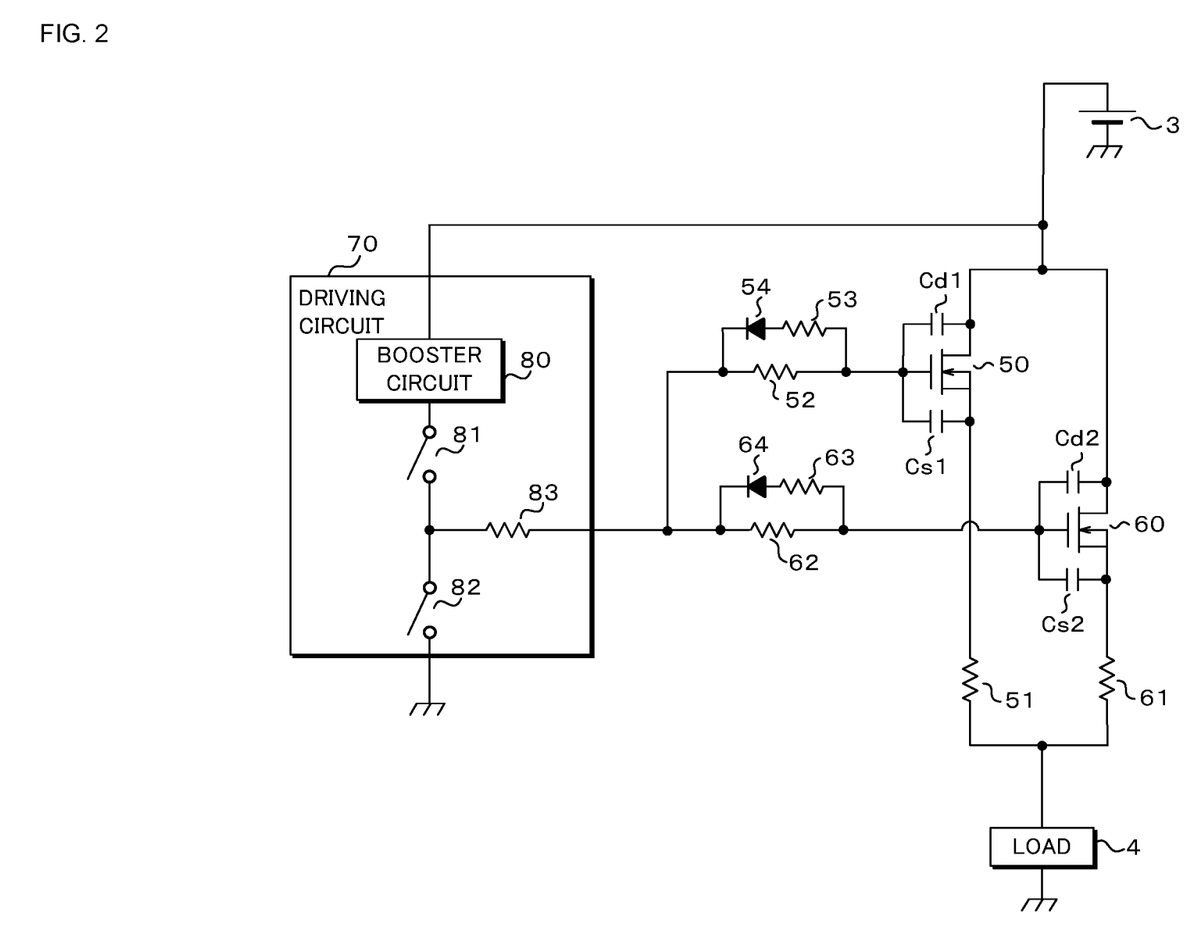
FIG. 2 is a block diagram illustrating a main configuration of a driving circuit.

FIG. 2 is a block diagram illustrating a main configuration of the driving circuit 70. The driving circuit 70 has a booster circuit 80, a charge switch 81, a discharge switch 82, and a circuit resistor 83. The booster circuit 80 is connected to the positive electrode of the DC power supply 3 and one end of the charge switch 81. The other end of the charge switch 81 is connected to one end of the discharge switch 82. The other end of the discharge switch 82 is grounded. A connection node between the charge switch 81 and the discharge switch 82 is connected to one end of the circuit resistor 83. The other end of the circuit resistor 83 is connected to the other ends of the charge resistors 52 and 62.

Figure 3:
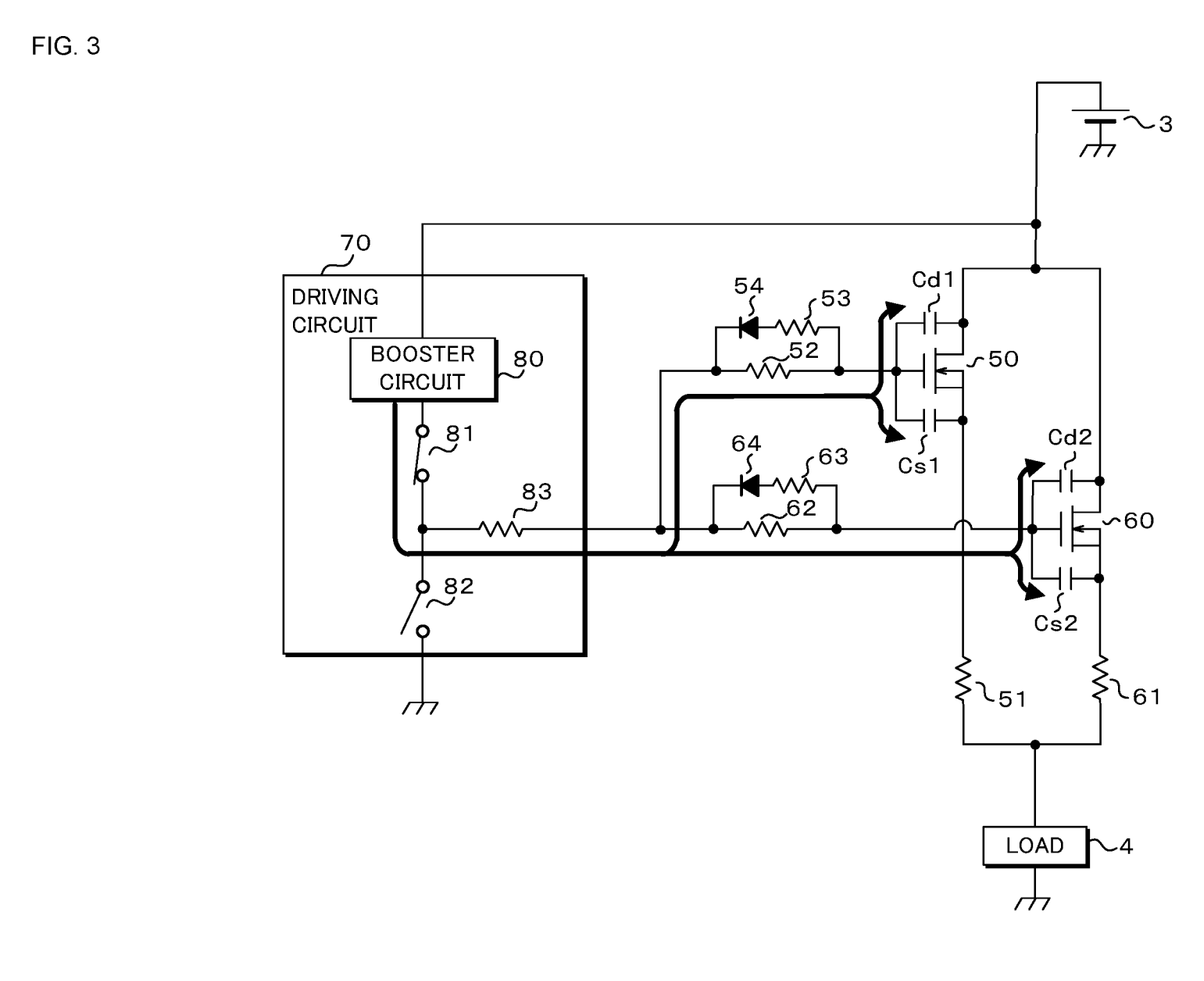
FIG. 3 is an explanatory diagram of switching to ON of FETs.

FIG. 3 is an explanatory diagram of switching to ON of the FETs 50 and 60. When the voltage output from the microcomputer 72 to the driving circuit 70 is switched from the low level voltage to the high level voltage, the booster circuit 80 operates, the charge switch 81 is switched on and the discharge switch 82 is switched off. The booster circuit 80 is also called a charge pump circuit, and boosts the output voltage of the DC power supply 3 to a target voltage. The booster circuit 80 applies the boosted voltage (target voltage) to the gate of the FET 50 through the circuit resistor 83 and the charge resistor 52, and applies the boosted voltage to the gate of the FET 60 through the circuit resistor 83 and the charge resistor 62.

When the booster circuit 80 applies the boosted voltage to the gate of the FET 50, a current flows to the input capacitors Cd1 and Cs1 of the FET 50 through the circuit resistor 83 and the charge resistor 52. Therefore, the input capacitors Cd1 and Cs1 are charged. In the FET 50, the gate voltage value having a reference corresponding to the potential of the source increases to a voltage value equal to or higher than the ON threshold value. As a result, the FET 50 is switched on. The charging speed of the input capacitor Cs1 is faster as the resistance value of the charge resistor 52 is smaller. The charging speed of the input capacitor Cs1 is faster as the capacitance value of the input capacitor Cs1 is smaller. Similarly, the charging speed of the input capacitor Cd1 is faster as the resistance value of the charge resistor 52 is smaller. The charging speed of the input capacitor Cd1 is faster as the capacitance value of the input capacitor Cd1 is smaller. Therefore, the speed at which the FET 50 is switched from OFF to ON is faster as the resistance value of the charge resistor 52 is smaller.

When the booster circuit 80 applies the boosted voltage to the gate of the FET 60, a current flows to the input capacitors Cd2 and Cs2 of the FET 60 through the circuit resistor 83 and the charge resistor 62. Therefore, the input capacitors Cd2 and Cs2 are charged. In the FET 60, the gate voltage value having a reference corresponding to the potential of the source increases to a voltage value equal to or higher than the ON threshold value. As a result, the FET 60 is switched on. The charging speed of the input capacitor Cs2 is faster as the resistance value of the charge resistor 62 is smaller. The charging speed of the input capacitor Cs2 is faster as the capacitance value of the input capacitor Cs2 is smaller. Similarly, the charging speed of the input capacitor Cd2 is faster as the resistance value of the charge resistor 62 is smaller. The charging speed of the input capacitor Cd2 is faster as the capacitance value of the input capacitor Cd2 is smaller. Therefore, the speed at which the FET 60 is switched from OFF to ON is faster as the resistance value of the charge resistor 62 is smaller.

As described above, the booster circuit 80 outputs the boosted voltage from the common output end, and applies the boosted voltage to the gates of the FETs 50 and 60 through the circuit resistor 83. The charge resistors 52 and 62 are respectively disposed in two applying paths through which the boosted voltage is applied from the output end of the booster circuit 80 to the gates of the FETs 50 and 60. As described above, the diode 54 is connected between both ends of the charge resistor 52, and the diode 64 is connected between both ends of the charge resistor 62. The cathodes of the diodes 54 and 64 are disposed on a side of the booster circuit 80. The circuit resistor 83 corresponds to a first resistor. The booster circuit 80 functions as a voltage applying unit.

Figure 4:
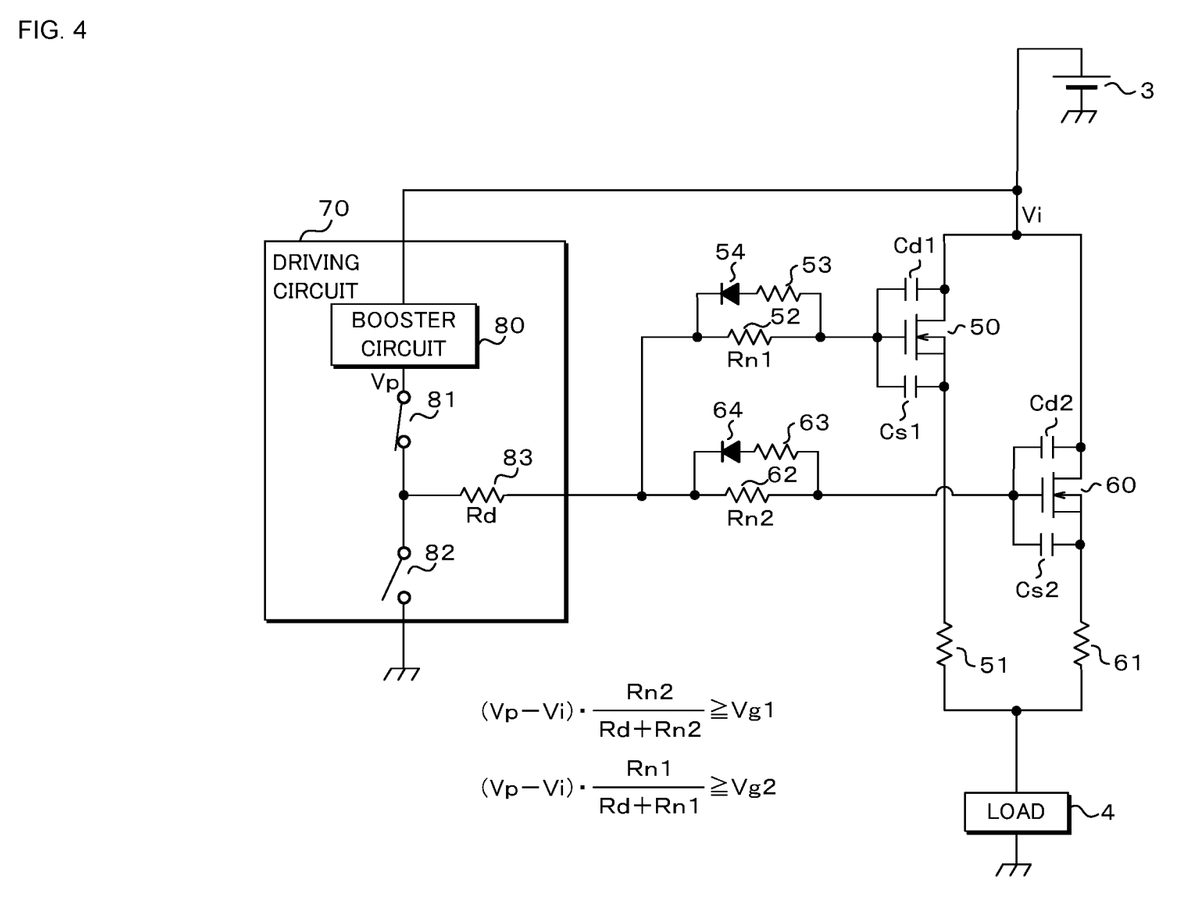
FIG. 4 is an explanatory diagram of the conditions satisfied in a power supply control device.

FIG. 4 is an explanatory diagram of the conditions satisfied in the power supply control device 2. Hereinafter, the voltage value of the voltage (target voltage) output from the output end by the booster circuit 80 is written as Vp. The voltage values of the drains of the FETs 50 and 60 are written as Vi. The resistance value of the circuit resistor 83 is written as Rd. The resistance values of the charge resistors 52 and 62 are written as Rn1 and Rn2, respectively. The ON threshold value of the FET 50 is a voltage value between the source and the gate, and is a voltage value necessary for switching on the FET 50. The ON threshold value of the FET 50 is written as Vg1. The ON threshold value of the FET 60, that is, a voltage value necessary for switching on the FET 60 is written as Vg2. The voltage values Vp and Vi are voltage values having a reference corresponding to the ground potential.

As one of the failures of the FETs 50 and 60, a short-circuit failure can be mentioned in which the gate and the source are short-circuited and the drain and the source are short-circuited.

In the power supply control device 2, in a case where the short-circuit failure occurs in the FET 60, the following Expression (1) is satisfied when both charging and discharging of each of the input capacitors Cd1 and Cs1 is stopped.

$$((Vp-Vi)\cdot Rn2/(Rd+Rn2))>Vg1 \quad (1)$$

Similarly, in a case where the short-circuit failure occurs in the FET 50, the following Expression (2) is satisfied when both charging and discharging of each of the input capacitors Cd2 and Cs2 of the FET 60 is stopped.

$$((Vp-Vi)\cdot Rn1/(Rd+Rn1))\geq Vg2 \quad (2)$$

It is noted that the resistance value Rd corresponds to the resistance value R1. Each of the resistance values Rn1 and Rn2 corresponds to the resistance value R2. Each of the voltage values Vg1 and Vg2 corresponds to the voltage value Vg.

In a case where Expression (1) is satisfied, even when the short-circuit failure occurs in the FET 60 in a state in which the FET 50 is ON, the FET 50 maintains the ON state without being switched off. In a case where Expression (2) is satisfied, even when the short-circuit failure occurs in the FET 50 in a state in which the FET 60 is ON, the FET 60 maintains the ON state without being switched off. The reason why the FETs 50 and 60 maintain the ON state will be described below.

Figure 5:
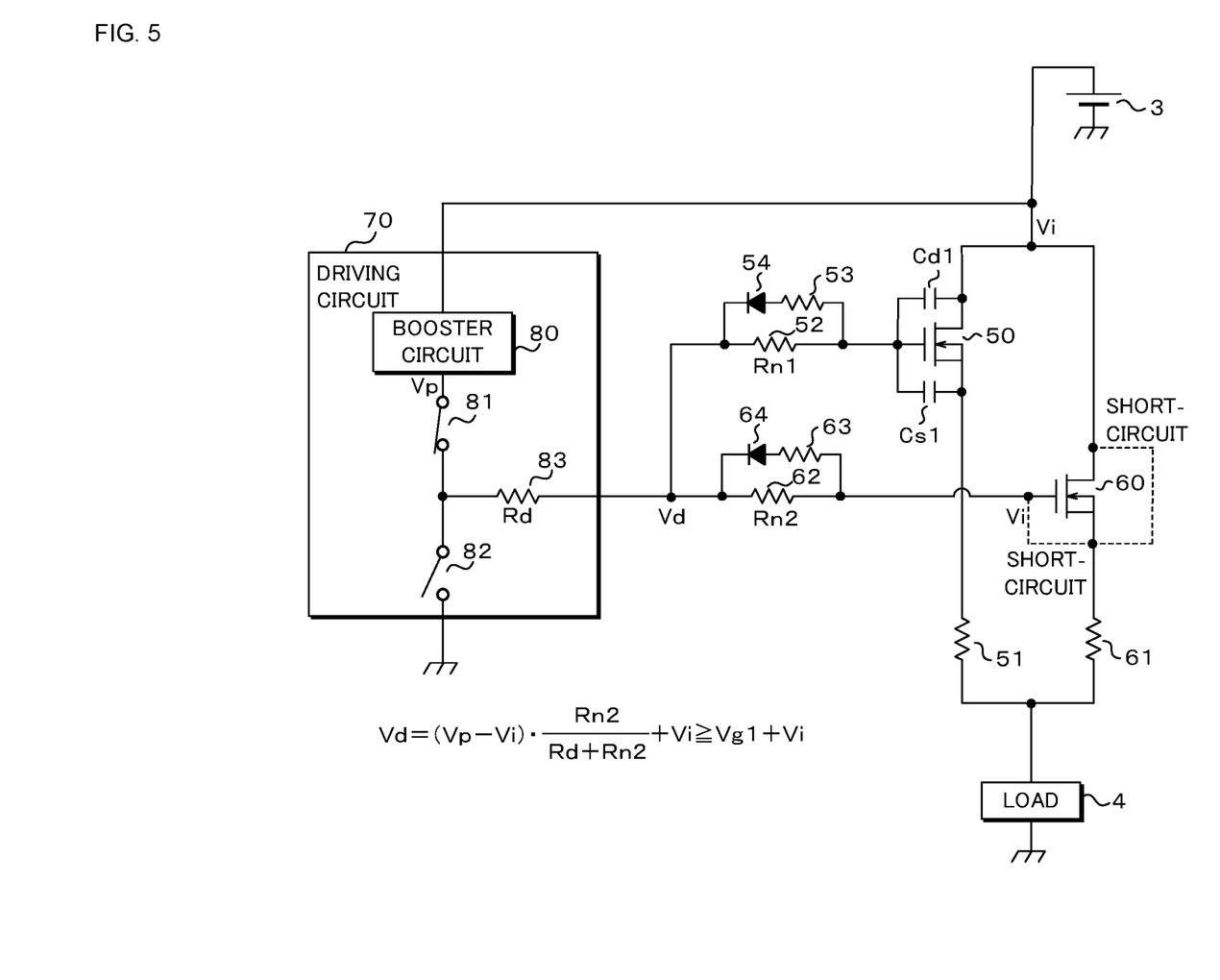
FIG. 5 is an explanatory diagram of the effect of the power supply control device.

FIG. 5 is an explanatory diagram of the effect of the power supply control device 2. Hereinafter, the voltage value of a connection node between each of the charge resistors 52 and 62 and the circuit resistor 83 is written as Vd. The voltage value Vd is also a voltage value having a reference corresponding to the ground potential. It is assumed that the short-circuit failure has occurred in the FET 60 in a case where the booster circuit 80 outputs a boosted voltage from the output end. At this time, the charge switch 81 is ON and the discharge switch 82 is OFF.

When the short-circuit failure occurs in the FET 60, a current flows from the output end of the booster circuit 80 in order of the charge switch 81, the circuit resistor 83, the charge resistor 62, the gate of the FET 60, and the source of the FET 60. In the input capacitors Cd1 and Cs1 of the FET 50, the discharging or charging is performed. When the discharging or charging of the input capacitors Cd1 and Cs1 is completed, all of the current flowing through the circuit resistor 83 flows through the charge resistor 62, and no current flows through the charge resistor 52. At this time, in the FET 50, the gate voltage value having a reference corresponding to the ground potential is identical with the voltage value Vd.

When both discharging and charging of each of the input capacitors Cd1 and Cs1 is stopped, the voltage value Vd is expressed by the following Expression (3).

$$Vd=((Vp-Vi)\cdot Rn2/(Rd+Rn2))+Vi \quad (3)$$

Expression (3) can also be expressed as follows.

$$Vd=(Vp-Vi)/((Rd/Rn2)+1)+Vi$$

Therefore, the voltage value Vd is higher as the resistance value Rn2 of the charge resistor 62 is larger. When the voltage value Vd is higher than the voltage value Vi and the difference between the voltage values Vd and Vi is equal to or higher than the voltage value Vg1, the FET 50 is ON.

When Expression (1) is satisfied, the following Expression (4) is satisfied.

$$Vd\geq Vg1+Vi \quad (4)$$

Expression (4) can be obtained by eliminating the voltage value Vp using Expressions (1) and (3).

When Expression (1) is satisfied, the voltage value Vd is higher than the voltage value Vi and the difference between the voltage values Vd and Vi is equal to or higher than the voltage value Vg1. As a result, the FET 50 maintains the ON state. In a case where Expression (1) is satisfied, even when the short-circuit failure occurs in the FET 60, the FET 50 maintains the ON state.

Similarly, when the short-circuit failure occurs in the FET 50, a current flows from the output end of the booster circuit 80 in order of the charge switch 81, the circuit resistor 83, the charge resistor 52, the gate of the FET 50, and the source of the FET 50. In the input capacitors Cd2 and Cs2 of the FET 60, the discharging or charging is performed. When the discharging or charging of the input capacitors Cd2 and Cs2 is completed, all of the current flowing through the circuit resistor 83 flows through the charge resistor 52, and no current flows through the charge resistor 62. At this time, in the FET 60, the gate voltage value having a reference corresponding to the ground potential is identical with the voltage value Vd.

When both discharging and charging of each of the input capacitors Cd2 and Cs2 is stopped, the voltage value Vd is expressed by the following Expression (5).

$$Vd=((Vp-Vi)\cdot Rn1/(Rd+Rn1))+Vi \quad (5)$$

Expression (5) can also be expressed as follows.

$$Vd=(Vp-Vi)/((Rd/Rn1)+1)+Vi$$

Therefore, the voltage value Vd is higher as the resistance value Rn1 of the charge resistor 52 is larger. When the voltage value Vd is higher than the voltage value Vi and the difference between the voltage values Vd and Vi is equal to or higher than the voltage value Vg2, the FET 60 is ON.

When Expression (2) is satisfied, the following Expression (6) is satisfied.

$$Vd>Vg2+Vi \quad (6)$$

Expression (6) can be obtained by eliminating the voltage value Vp using Expressions (2) and (5).

When Expression (2) is satisfied, the voltage value Vd is higher than the voltage value Vi and the difference between the voltage values Vd and Vi is equal to or higher than the voltage value Vg2. As a result, the FET 60 maintains the ON state. In a case where Expression (2) is satisfied, even when the short-circuit failure occurs in the FET 50, the FET 60 maintains the ON state.

As described above, in the power supply control device 2, in a case where resistors having large resistance values are used as the charge resistors 52 and 62, even when the short-circuit failure occurs in one of the FETs 50 and 60, the other FET maintains the ON state without being switched off. As a result, it is possible to prevent the current from concentrating on the FET in which the short-circuit failure has occurred, that is, it is possible to prevent the excessive current from flowing to the FET in which the short-circuit failure has occurred. In addition, Expressions (1) and (2) are satisfied. Therefore, when the short-circuit failure occurs in one of the FETs 50 and 60, the other FET reliably maintains the ON state.

Figure 6:
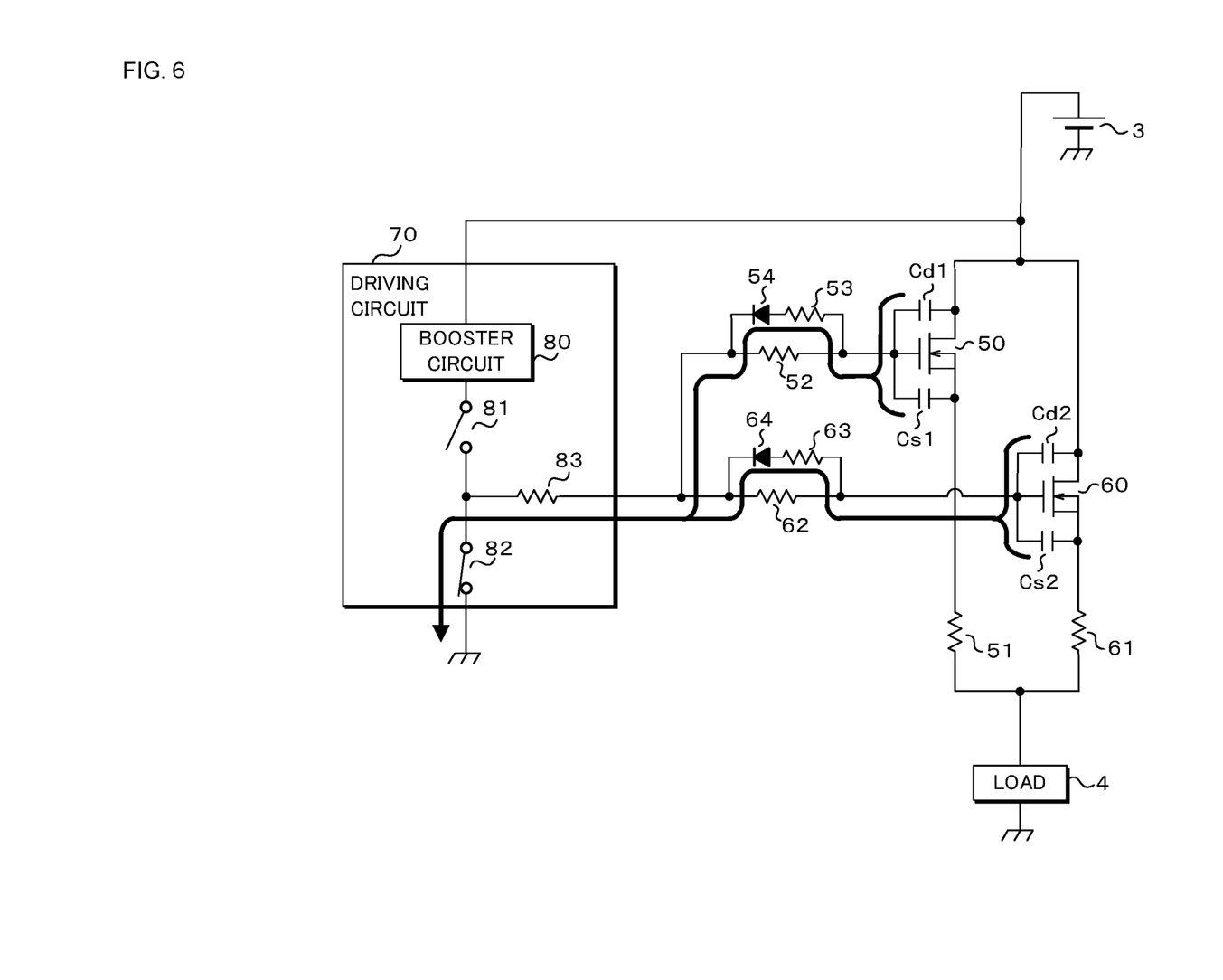
FIG. 6 is an explanatory diagram of switching to OFF of FETs.

FIG. 6 is an explanatory diagram of switching to OFF of the FETs 50 and 60. When the voltage output from the microcomputer 72 to the driving circuit 70 is switched from the high level voltage to the low level voltage, the booster circuit 80 stops operating, the charge switch 81 is switched off and the discharge switch 82 is switched on.

As described above, when the FETs 50 and 60 are ON, the input capacitors Cd1, Cs1, Cd2, and Cs2 are charged. When the discharge switch 82 is switched on, the input capacitors Cd1, Cs1, Cd2, and Cs2 are discharged.

As described above, the resistance value of the discharge resistor 53 is smaller than the resistance value of the charge resistor 52. For this reason, when the input capacitors Cd1 and Cs1 of the FET 50 are discharged, a current flows from one end of each of the input capacitors Cd1 and Cs1 on the side of the gate in order of the discharge resistor 53, the diode 54, the circuit resistor 83, and the discharge switch 82. While the input capacitors Cd1 and Cs1 are discharged, the power stored in the input capacitors Cd1 and Cs1 decreases with the lapse of time. As a result, in the FET 50, the gate voltage value having a reference corresponding to the potential of the source decreases to a voltage value lower than the OFF threshold value, and the FET 50 is switched off.

The discharging speed of the input capacitor Cd1 is faster as the resistance value of the discharge resistor 53 is smaller. The discharging speed of the input capacitor Cd1 is faster as the capacitance value of the input capacitor Cd1 is smaller. Similarly, the discharging speed of the input capacitor Cs1 is faster as the resistance value of the discharge resistor 53 is smaller. The discharging speed of the input capacitor Cs1 is faster as the capacitance value of the input capacitor Cs1 is smaller. Therefore, the speed at which the FET 50 is switched from ON to OFF is faster as the resistance value of the discharge resistor 53 is smaller. As described above, the resistance value of the discharge resistor 53 is smaller than the resistance value of the charge resistor 52. Therefore, the speed at which the FET 50 is switched from ON to OFF is faster than the speed at which the FET 50 is switched from OFF to ON.

As described above, the resistance value of the discharge resistor 63 is smaller than the resistance value of the charge resistor 62. For this reason, when the input capacitors Cd2 and Cs2 of the FET 60 are discharged, a current flows from one end of each of the input capacitors Cd2 and Cs2 on the side of the gate in order of the discharge resistor 63, the diode 64, the circuit resistor 83, and the discharge switch 82. While the input capacitors Cd2 and Cs2 are discharged, the power stored in the input capacitors Cd2 and Cs2 decreases with the lapse of time. As a result, in the FET 60, the gate voltage value having a reference corresponding to the potential of the source decreases to a voltage value lower than the OFF threshold value, and the FET 60 is switched off.

The discharging speed of the input capacitor Cd2 is faster as the resistance value of the discharge resistor 63 is smaller. The discharging speed of the input capacitor Cd2 is faster as the capacitance value of the input capacitor Cd2 is smaller. Similarly, the discharging speed of the input capacitor Cs2 is faster as the resistance value of the discharge resistor 63 is smaller. The discharging speed of the input capacitor Cs2 is faster as the capacitance value of the input capacitor Cs2 is smaller. Therefore, the speed at which the FET 60 is switched from ON to OFF is faster as the resistance value of the discharge resistor 63 is smaller. As described above, the resistance value of the discharge resistor 63 is smaller than the resistance value of the charge resistor 62. The speed at which the FET 60 is switched from ON to OFF is faster than the speed at which the FET 60 is switched from OFF to ON.

As described above, in the power supply control device 2, a series circuit including the discharge resistor 53 and the diode 54 is connected between both ends of the charge resistor 52. Therefore, the power stored in the input capacitors Cd1 and Cs1 is quickly emitted, so that the FET 50 can be quickly switched off. Similarly, a series circuit including the discharge resistor 63 and the diode 64 is connected between both ends of the charge resistor 62. Therefore, the power stored in the input capacitors Cd2 and Cs2 is quickly emitted, so that the FET 60 can be quickly switched off. As described above, when the microcomputer 72 determines that the current value of the current flowing through the FETs 50 and 60 is equal to or larger than the reference current value, the voltage output to the driving circuit 70 is switched to the low level voltage, and the driving circuit 70 switches off the FETs 50 and 60. This prevents an overcurrent from flowing through the FETs 50 and 60.

When the current value is equal to or larger than the reference current value, that is, when large heat is generated in the FETs 50 and 60, it is preferable that the period during which a current flows through the FETs 50 and 60 is short. When the period during which a current flows through the FETs 50 and 60 is short, the temperature rise of the FETs 50 and 60 is suppressed. In the power supply control device 2, since the FETs 50 and 60 are quickly switched off, the period during which a current flows through the FETs 50 and 60 is short, and the temperature rise of the FETs 50 and 60 is suppressed.

In the power supply control device 2, as long as the discharge resistor 53 and the diode 54 are connected in series, the diode 54 may be disposed on the FET 50 side of the discharge resistor 53. Also in this case, the cathode of the diode 54 is disposed on the side of the booster circuit 80. Similarly, as long as the discharge resistor 63 and the diode 64 are connected in series, the diode 64 may be disposed on the FET 60 side of the discharge resistor 63. Also in this case, the cathode of the diode 64 is disposed on the side of the booster circuit 80.

The power supply control device 2 may not include the series resistor 51. In this case, the source of the FET 50 is connected to one end of the load 4. Similarly, the power supply control device 2 may not include the series resistor 61. In this case, the source of the FET 60 is connected to one end of the load 4.

Each of the FETs 50 and 60 may function as a transistor in which the resistance value between the current input end and the current output end decreases as the voltage value of the control end having a reference corresponding to the potential of the current output end increases. For this reason, instead of the FETs 50 and 60, transistors different from the FETs, for example, insulated gate bipolar transistors (IGBTs) may be used. The gate, collector, and emitter of the IGBT correspond to the gate, drain, and source of the FET, respectively.

As long as circuit resistor 83 is disposed in a common portion of the applying paths through which the booster circuit 80 applies a voltage from the output end to the gates of the FETs 50 and 60, the circuit resistor 83 may be disposed between the output end of the booster circuit 80 and the charge switch 81, for example. In this case, a connection node between the charge switch 81 and the discharge switch 82 is connected to one ends of the charge resistors 52 and 62 on side of the booster circuit 80.

As described above, when the DC power supply 3 supplies power to the load 4, a current flows through the common power supply path, and the common power supply path is branched into two branch paths. Various elements may be disposed in the common power supply path. For example, a resistor may be disposed in the common power supply path. In this case, the output voltage value of the DC power supply 3 is different from the voltage values of the drains of the FETs 50 and 60. In addition, in the power supply control device 2, the series resistors 51 and 61 are respectively disposed in the two branch paths. However, the configuration of the power supply control device 2 may be a configuration in which one or both of the series resistors 51 and 61 are not disposed. When the series resistor 51 is not disposed, the source of the FET 50 is directly connected to one end of the load 4. In this case, instead of the current detection circuit 71, for example, a current sensor that can detect a current without using a resistor is used. When the series resistor 61 is not disposed, the source of the FET 60 is directly connected to one end of the load 4. Other elements may be disposed instead of the series resistors 51 and 61.

As the configuration of the power supply control device 2, a configuration in which the common power supply path branches and the number of branch paths where transistors are disposed is two has been described. However, the configuration of the power supply control device 2 can be extended to a configuration in which the number of branch paths is three or more. In this case, a circuit similar to the circuit configured by the charge resistor 52, the discharge resistor 53, and the diode 54 is disposed in the applying path through which the driving circuit 70 applies a voltage to the control end of each transistor. In each circuit, the resistance value of the charge resistor is larger than the resistance value of the discharge resistor. By considering the state in which the short-circuit failure has occurred in each transistor, a conditional expression similar to the conditional expression such as Expression (1) or Expression (2) can be set. The configuration in which the number of branch paths is three or more includes a configuration in which the number of branch paths is two.

It is noted that, as used herein and in the appended claims, the singular forms "a", "an", and "the" include plural referents unless the context clearly dictates otherwise.

It is to be noted that the disclosed Embodiment is illustrative and not restrictive in all aspects. The scope of the present disclosure is defined by the appended claims rather than by the description preceding them, and all changes that fall within metes and bounds of the claims, or equivalence of such metes and bounds thereof are therefore intended to be embraced by the claims.

What is claimed is:

1. A power supply control device for controlling power supply to a load through two branch paths branched from a common power supply path where a positive electrode of a DC power supply is disposed, comprising:
    two transistors which are respectively disposed in the two branch paths, each transistor having a resistance value between a drain to which a current is input and a source from which the current is output, the resistance value decreasing as a voltage value of a gate having a reference corresponding to a potential of the source increases;
    a driving circuit including a voltage applying unit, a charge switch, a discharge switch, and a first resistor;
    an applying path connecting the driving circuit to the gate of each of the two transistors, the applying path including a first path and a second path, the gate of one of the two transistors connected to the first path and the gate of the other of the two transistors connected to the second path, wherein the discharge switch is connected to ground and is connected in parallel with the first resistor, the first resistor disposed on the applying path and interposed between the charge switch and the two transistors, the voltage applying unit outputs a voltage from a common output end and applies the voltage to the gates of the two transistors when the charge switch is turned on and the discharge switch is turned off so as to supply a current of a boosted voltage through the first resistor;
    two second resistors that are respectively disposed in the first path and the second path through which the boosted voltage is applied from the output end of the voltage applying unit to the gates of the two transistors; and
    two diodes, each of which is connected between both ends of each of the two second resistors and has a cathode disposed on a side of the voltage applying unit;
    wherein the current is output from the source of each of the two transistors to the load, and
    the voltage applying unit boosts an output voltage of the DC power supply and outputs the boosted voltage from the source of each of the two transistors, wherein a resistance value of the first resistor and the two second resistors are configured to maintain an ON state of one of the two transistors when a short-circuit failure occurs in the other of the two transistors, wherein one of the two transistors remains ON when a short circuit occurs in the other of the two transistors as a gate voltage value having a reference corresponding to the ground potential of the other of the two transistors is identical with the gate voltage value, the gate voltage value being higher than the voltage value at the drain of the other of the two transistors.

2. The power supply control device according to claim 1, further comprising:
    two third resistors that are respectively connected in series to the two diodes,
    wherein each of two series circuits includes one diode of the two diodes and one third resistor of the two third resistors and is connected between both the ends of each of the two second resistors, so as to place a corresponding one of the two third resistors with a corresponding one of the two second resistors in parallel with each other, and
    wherein each of the two second resistors has a resistance value larger than a resistance value of the third resistor connected between both ends of each of the two second resistors.

3. The power supply control device according to claim 1, wherein a voltage value Vp of the voltage output from the output end by the voltage applying unit, a voltage value Vi of the drain of a first transistor included in the two transistors, a resistance value R1 of the first resistor, and a resistance value R2 of the second resistor disposed in the second path through which the voltage is applied to the gate of a second transistor included in the two transistors satisfy a following expression:

$$(Vp-Vi)\cdot R2/(R1+R2) \geq Vg,$$

where Vg is a voltage value between the source and the gate and is the voltage value necessary for switching on the first transistor.

4. The power supply control device according to claim 1, wherein a first series resistor is disposed on one of the two branch paths and is in series with one of the two transistors, and a second series resistor is disposed on the other of the two branch paths and is in series of the other of the two transistors, the first series resistor and the second series resistor interposed between the corresponding one of the two transistors and the load.

5. The power supply control device according to claim 3, wherein each of the two transistors includes a first input capacitor connected between the gate and the drain and a second input capacitor connected between the gate and the source.

* * * * *